Aug. 15, 1967
T. O. YINGST ET AL
3,335,952
REGULATOR
Filed July 15, 1965
2 Sheets-Sheet 1
FIG.1.
FIG.2.
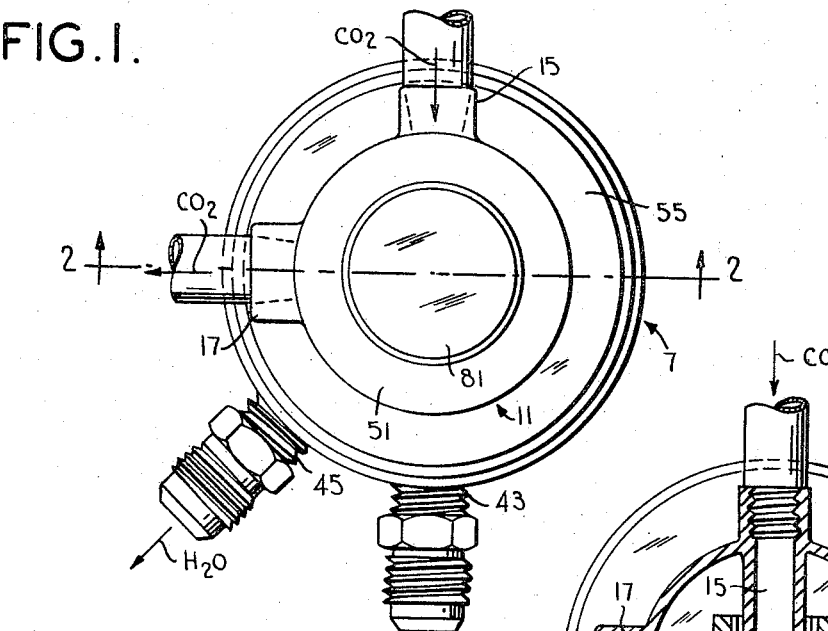
FIG.5.
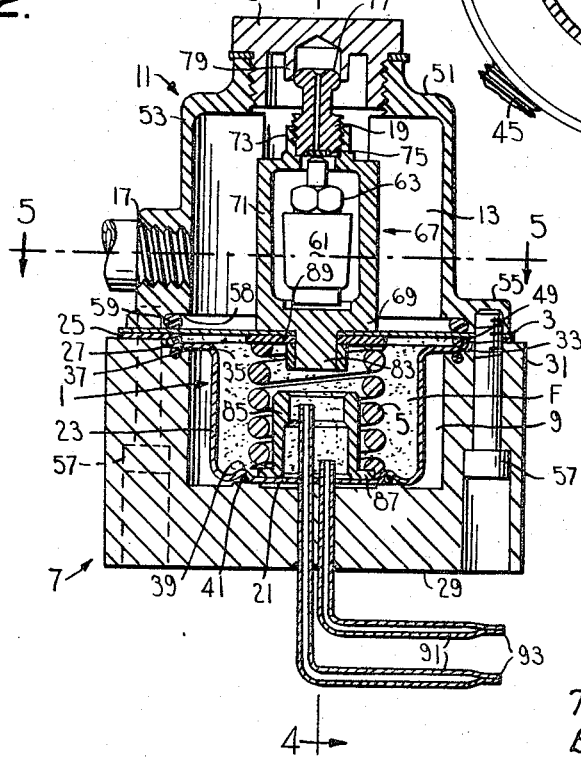
Thomas O. Yingst,
Burl E. Tucker, Jr.,
Inventors.
Koenig, Senniger, Powers and Leavitt,
Attorneys.

Aug. 15, 1967   T. O. YINGST ET AL   3,335,952
REGULATOR
Filed July 15, 1965                                             2 Sheets-Sheet 2
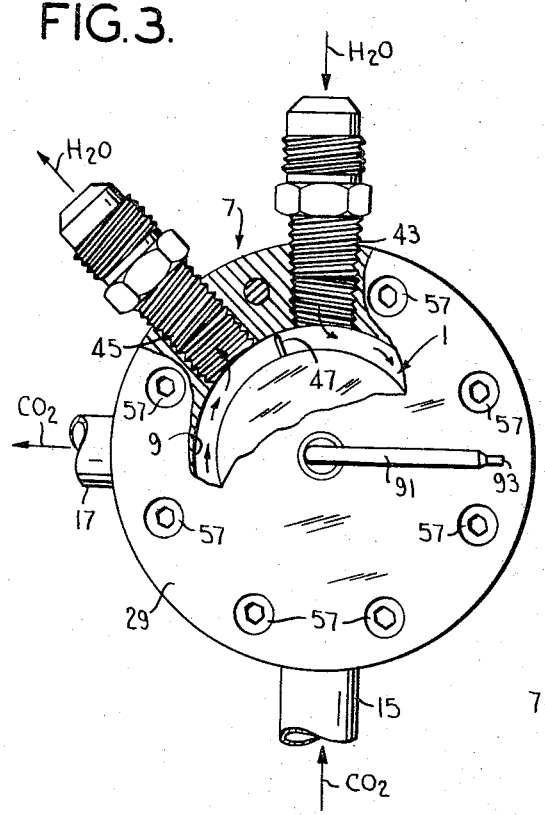
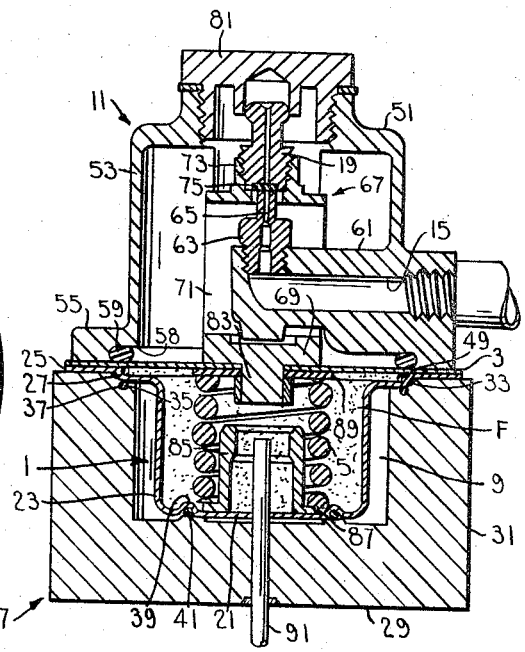
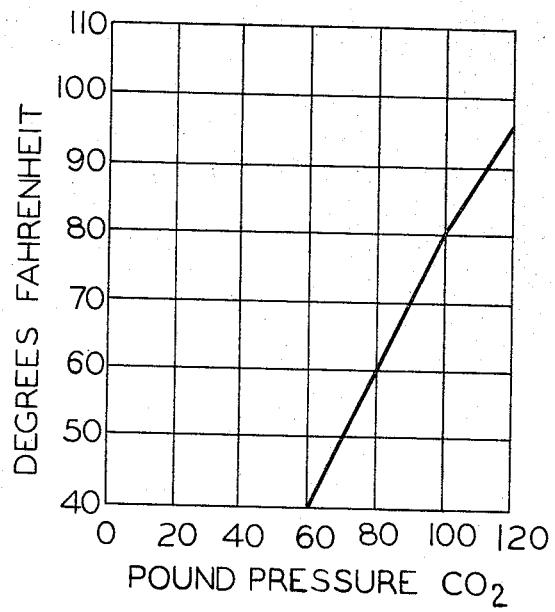

United States Patent Office 3,335,952
Patented Aug. 15, 1967

3,335,952
REGULATOR
Thomas O. Yingst, Pevely, Mo., and Burl E. Tucker, Jr., Hartford City, Ind., assignors to Universal Match Corporation, St. Louis, Mo., a corporation of Delaware
Filed July 15, 1965, Ser. No. 472,257
4 Claims. (Cl. 236—92)

ABSTRACT OF THE DISCLOSURE

A regulator for $CO_2$ gas being supplied along with water to the carbonator of vendor or soda fountain equipment, which regulator varies the pressure of the $CO_2$ in accordance with variations in the temperature of the water. Concentric cups form a passage for the water and the inner cup contains a temperature-sensitive fluid. A diaphragm of the $CO_2$ valve actuator closes the open end of the inner cup.

---

This invention relates to regulators for carbonators, and more particularly to a temperature-compensated pressure regulator for carbon dioxide ($CO_2$) gas being delivered along with water to a carbonator.

It will be understood that vending machines for vending carbonated beverages and soda fountain equipment may include a carbonator which is supplied with tap water and $CO_2$ gas for carbonating the tap water to provide a supply of carbonated water for being dispensed and mixed with flavorings to constitute the carbonated beverages. It is important that the carbonated water produced in the carbonator have a predetermined degree of carbonation, by which is meant a predetermined ratio of volume of $CO_2$ gas to volume of water. Heretofore, it has been conventional to use a pressure regulator in the line which delivers the $CO_2$ gas to the carbonator, this regulator being set to maintain a substantially constant pressure of the gas supplied to the carbonator. However, it has been found that if the pressure of the $CO_2$ gas is maintained substantially constant, and the temperature of the tap water being supplied to the carbonator varies (as may occur even in the course of a single day), the degree of carbonation may vary widely. Thus, with the pressure of the $CO_2$ gas constant for all temperatures, the degree of carbonation will be relatively low if the temperature of the water is high, and relatively high if the temperature of the water is low. The pressure of the water delivered to the carbonator has some effect on the degree of carbonation, but this is relatively minor.

Accordingly, among the several objects of the invention may be noted the provision of a regulator for $CO_2$ gas being supplied along with water to a carbonator which, while maintaining the pressure of the $CO_2$ gas substantially constant for a given water temperature, is adapted automatically to vary the value of the pressure of the $CO_2$ gas in accordance with variations in the temperature of the water, acting to increase the pressure value on increase of water temperature and to decrease the pressure value on decrease of water temperature. For example, the regulator may hold a $CO_2$ gas pressure value of 85 p.s.i. for water at 70° F., increase this to 105 p.s.i. if the water temperature increases to 90° F., and decrease this to 65 p.s.i. if the water temperature decreases to 50° F. A further object of the invention is the provision of a regulator such as described which is of economical construction, having few moving parts, and reliable and accurate in operation. A feature of the invention is that the temperature of the water is sensed by a temperature-sensitive fluid in a cup closed by a diaphragm, the latter controlling a $CO_2$ gas pressure regulating valve, with the arrangement such that the action of the valve is responsive both to $CO_2$ gas pressure and water temperature, in effect to reset the regulator to hold the pressure of the $CO_2$ gas substantially constant at different values according to the water temperature (higher values for higher temperatures, lower values for lower temperatures). It is contemplated that the regulator may be adapted to respond to ambient air temperature, as a measure of water temperature, as will appear. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan of a regulator of this invention;
FIG. 2 is a section taken on line 2—2 of FIG. 1;
FIG. 3 is a bottom plan partly broken away and shown in section;
FIG. 4 is a section on line 4—4 of FIG. 2;
FIG. 5 is a section on line 5—5 of FIG. 2; and
FIG. 6 is a chart showing the temperature-pressure characteristic of the regulator.

Corresponding reference characters indicate corresponding parts throughout the several views of the drawings.

Referring to the drawings, a regulator of this invention is shown generally to comprise a cup 1 closed by a flexible diaphragm 3. The cup contains a temperature-sensitive or temperature-responsive fluid F which is adapted on increase of its temperature to flex the diaphragm outward relative to the cup 1 and on decrease of its temperature to allow the diaphragm to flex back inward, noting that the diaphragm is exposed on one side to the fluid in the cup. Any suitable fluid of such character may be used. A particularly suitable fluid for the purpose is Freon C-318 (octafluorocyclobutane) sold by E. I. du Pont de Nemours & Company of Wilmington, Delaware. A spring 5 in the cup tends to flex the diaphragm outward relative to the cup.

Means is provided to establish a passage for flow of water from a supply to a carbonator in heat-exchange relation with respect to the fluid in the cup so that the fluid may sense the temperature of the water supplied to the carbonator and act on the diaphragm accordingly. As shown, this means comprises a cup-shaped jacket 7 surrounding the cup 1 defining a chamber 9 through which water may flow around the peripheral wall of the cup.

A cup-shaped valve body 11 is provided on the other side of the diaphragm. This body is formed to provide a chamber 13 for $CO_2$ gas, and has an inlet 15 and an outlet 17 for flow of $CO_2$ gas into and out of the chamber 13. The diaphragm is exposed on its other side from fluid F in cup 1 to the $CO_2$ gas in chamber 13 and hence is responsive to pressure of $CO_2$ gas in chamber 13 as well as being responsive to pressure of the fluid in cup 1. A valve 19 in body 11 is connected to the diaphragm and is adapted to open on outward flexing of the diaphragm relative to cup 1 to admit $CO_2$ gas to chamber 13, and to close on inward flexing of the diaphragm relative to cup 1 to shut off the admission of $CO_2$ gas to chamber 13.

The valve 19 controls the pressure of $CO_2$ gas flowing to the carbonator through the outlet 17. Diaphragm 3, being subject on one side to the pressure of fluid F in cup 1 and on its other side to the pressure of $CO_2$ gas in chamber 13, automatically controls the valve in two ways: first, it increases or decreases the value of the pressure of $CO_2$ gas to be maintained in chamber 13 in accordance with the increase or decrease in the temperature of water flowing to the carbonator through chamber 9; and, second, it maintains substantially constant the pressure of the $CO_2$ gas in chamber 13 at whatever value is set in accordance with water temperature.

Cup 1, as herein illustrated, is a thin-walled sheet metal cup, having a circular closed end 21 and a cylindric peripheral wall 23. At the rim of the cup is an outwardly extending flange 25 having a step at 27. Jacket 7 is constituted by a thick-walled cup, having a thick circular closed end 29 and a thick cylindric peripheral wall 31. The rim of the jacket has an annular recess 33 around its inner margin, and an annular groove 35 for a sealing ring 37. The portion of flange 25 inward of step 27 seats in recess 33 on ring 37 and the portion of flange 25 outward of step 27 seats on the rim of the jacket. The closed end of the cup 1 has an annular rib 39 defining a groove receiving a sealing ring 41 which seats against the closed end of the jacket. The peripheral wall 23 of cup 1 is of smaller diameter than the internal diameter of jacket 7 to provide chamber 9, which is sealed by rings 37 and 41. Jacket 7 has a radial water inlet 43 and a radial water outlet 45 adjacent inlet 43. Cup 1 is provided with a fin 47 extending radially outward therefrom between the inlet and outlet constituting a baffle for enforcing flow of water from inlet 43 around the peripheral wall of cup 1 to the outlet 45.

Diaphragm 3 has its margin seated on the portion of flange 25 of cup 1 outward of step 27, a sealing ring 49 being interposed between the diaphragm and the portion of flange 25 inward of step 27 for sealing the cup 1 against escape of fluid F. Valve body 11 is generally of cup shape, having a circular closed end 51 and a cylindric peripheral wall 53. The latter has an outwardly extending rim 55 which seats against the margin of the diaphragm, the latter being tightly clamped between rim 55 and the outer portion of flange 25 by screws 57 received in holes in the peripheral wall of the jacket 7 and threaded in rim 55. The latter has a recess 58 accommodating a sealing ring 59 for sealing the chamber 13 against escape of $CO_2$ gas.

An arm 61 extends radially inward from the peripheral wall 53 of the valve body, the $CO_2$ gas inlet 15 being in this arm. Threaded in this arm adjacent the inner end of the arm is a nipple 63. This nipple is located on the axis of the valve body coaxial with the diaphragm, and has a passage 65 in communication with the inlet 15. The end of the nipple constitutes a seat for the valve 19. The latter is carried by a yoke 67 which straddles the arm 61, this yoke having a base 69 bearing against the diaphragm 3 and side members 71 lying on opposite sides of the arm 61. The valve 19 is threaded in a boss 73 at the end of the yoke opposite the base of the yoke and has an insert 75 of rubber or the like for engaging the end of nipple 63 to close off the passage 65 in the nipple. The valve 19 also has an extension 77 slidable in a guide 79 on a plug 81 threaded in the closed end 51 of the valve body 11.

A centering stud 83 extends from the base 69 of the yoke 67 through a center hole in the diaphragm 3. A tubular spring retainer 85 has a flange 87 seated on the base 21 of the cup 1 within the confines of rib 39. Spring 5 is a coil compression spring reacting from flange 87 against a metal washer 89 mounted on stud 83 engaging the diaphragm. Two tubes each designated 91 extend through the base 29 of jacket 7 and the base 21 of the cup 1 for charging the cup with fluid F. These are pinched at their ends as indicated at 93 after the cup has been charged.

Operation of the regulator is as follows:

Inlet 15 of the valve body of the regulator is connected to a source of $CO_2$ gas under pressure (e.g., a bottle of $CO_2$ gas) and outlet 17 is connected to a carbonator. Water inlet 43 of jacket 7 is connected to a source of water (e.g., tap water) and water outlet 45 is connected to the carbonator. Diaphragm 3 is biased to flex outward from the temperature-sensing fluid-filled cup 1 in the direction for opening valve 19 by the spring 5 and the fluid F in the cup. The bias of the fluid is greater for higher temperatures of water in chamber 9, lower for lower temperatures of water in chamber 9. Diaphragm 3 is biased to flex inward toward cup 1 (in opposition to the fluid bias) in the direction for closing valve 19 by pressure of $CO_2$ gas in chamber 13. For higher water temperatures, the valve-opening bias is increased; for lower water temperatures, the valve-opening bias is decreased. Accordingly, for higher water temperatures, higher $CO_2$ pressure in chamber 13 is required to close valve 19; for lower water temperatures, lower $CO_2$ pressure in chamber 13 is required to close the valve. Thus, the water-temperature-sensing fluid-filled cup acts to set the value of pressure of $CO_2$ gas to be maintained substantially constant in chamber 13, the value being higher for higher water temperatures and lower for lower water temperatures. Referring to the chart of FIG. 6, typical $CO_2$ pressures to be maintained are 60 p.s.i. for water at 40° F., 70 p.s.i. for water at 50° F., 80 p.s.i. for water at 60° F., 90 p.s.i. for water at 70° F., 100 p.s.i. for water at 80° F., etc.

For any pressure value for the $CO_2$ gas automatically set into the regulator by the action of the fluid F on diaphragm 3, the regulator automatically maintains that pressure as long as the water temperature is unchanged as follows: If the pressure drops below the set value, diaphragm 3 flexes in valve-opening direction, valve 19 opens, and $CO_2$ gas is admitted to chamber 13 until the pressure is built back up to the set value. This pressure acting on diaphragm 3 causes it to flex in valve-closing direction to close the valve 19 and hold it closed until the pressure drops again, whereupon the valve 19 reopens. Thus, for a water temperature of 70° F., for example, if the pressure of $CO_2$ gas in chamber drops below 90 p.s.i., valve 19 opens to restore the pressure to 90 p.s.i., then closes.

If the water temperature drops to 40° F., for example (as occurs in cold weather), the reduced pressure of the fluid F in cup 1 sets the regulator to maintain a pressure of 60 p.s.i. for the $CO_2$ gas in chamber 13. With such setting, if the pressure of $CO_2$ gas in chamber 13 drops below 60 p.s.i., valve 19 opens and $CO_2$ gas is admitted to chamber 13 until the pressure is restored to 60 p.s.i., then closes.

It is contemplated that the regulator may be made responsive to ambient air temperature (as a measure of water temperature). This can be done simply by omitting jacket 7 so that cup 1 is exposed to the atmosphere instead of to water. It may be desirable in such case to provide fins on cup 1 for faster temperature response.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A regulator for $CO_2$ gas being supplied along with water to a carbonator, comprising a cup-shaped jacket, a sheet metal cup in the jacket having an outwardly extending flange at its rim seated on the rim of the jacket, said cup being smaller than the jacket to provide a passage for flow of water around the cup, said jacket having a water inlet and a water outlet, a diaphragm having its margin seated on the flange of the cup and closing the open end of the cup, a cup-shaped valve body on the opposite side of the diaphragm from the cup and jacket having its open end engaging the margin of the diaphragm, means securing said jacket and body together and clamping the margin of the diaphragm between the open end of the valve body and said flange on the cup, a temperature-sensitive fluid in said cup acting on the cup side of said diaphragm for variably biasing the diaphragm to flex away from the cup in response to change of temperature of the fluid, said valve body providing a chamber for $CO_2$ gas on said opposite side of the diaphragm and having an inlet and an outlet for flow of $CO_2$ gas into and out of said chamber, said opposite side of the diaphragm being exposed to pressure of $CO_2$ gas in said chamber in opposition to the pressure of said fluid in the cup, and valve means in said body including a valve connected to said diaphragm for shutting off flow of $CO_2$ gas from the inlet to said chamber in response to increase in pressure of $CO_2$ in said chamber to a value determined by the bias of said fluid on said diaphragm.

2. A regulator as set forth in claim 1 having a compression spring in the cup reacting from the closed end of the cup against the diaphragm to bias the diaphragm to flex away from the cup.

3. A regulator as set forth in claim 1 wherein the closed end of the cup is sealed against the closed end of the jacket, the water inlet and water outlet extend radially from the peripheral wall of the jacket adjacent one another, and a baffle is provided in the space between the cup and jacket with the baffle extending radially between the water inlet and outlet so that water flows around the cup from the water inlet to the water outlet.

4. A regulator as set forth in claim 3 further comprising tubes for charging the cup with fluid extending through the closed end of the jacket and the closed end of the cup, said fluid consisting of octafluorocyclobutane.

References Cited

UNITED STATES PATENTS

| | | | |
|---|---|---|---|
| 1,622,973 | 3/1927 | Richards | 236—32 |
| 1,632,125 | 6/1927 | French et al. | 236—32 |
| 1,893,849 | 1/1933 | Sullivan. | |
| 2,335,595 | 11/1943 | Kromer et al. | 137—170.2 |
| 2,362,338 | 11/1944 | Anderson | 236—99 X |
| 3,219,236 | 11/1965 | Radcliffe | 137—505.44 |

EDWARD J. MICHAEL, *Primary Examiner.*